Sept. 8, 1942.　　　W. H. FORMHALS　　　2,295,395
SPEED CONTROL OF DIRECT CURRENT MOTORS
Filed Oct. 26, 1940
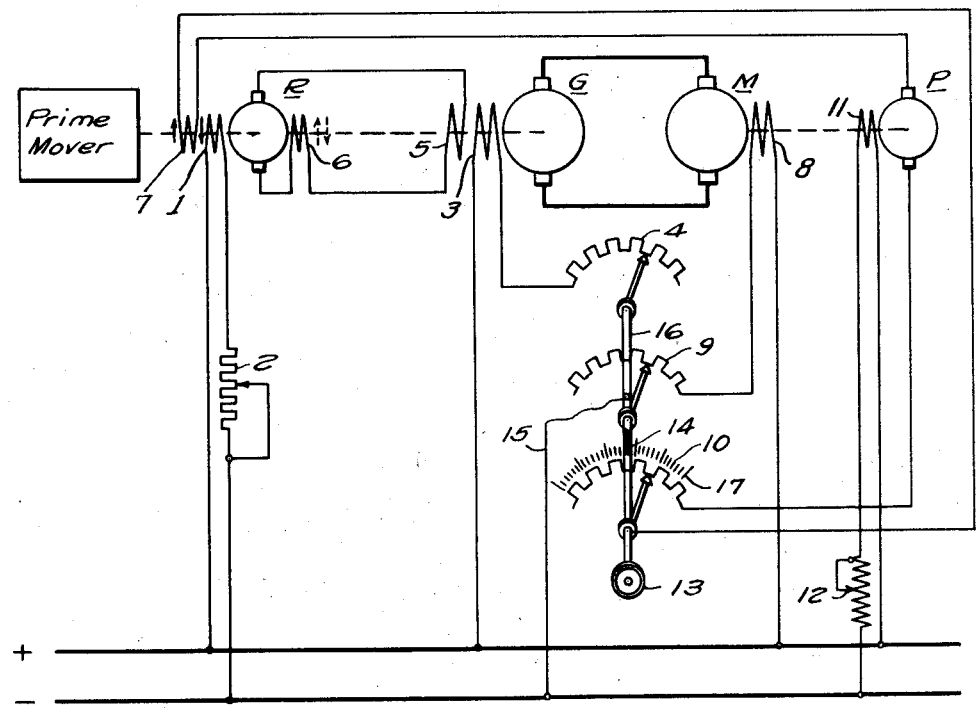
WITNESSES:
INVENTOR
William H. Formhals.
BY
Paul E. Friedemann
ATTORNEY Patented Sept. 8, 1942

2,295,395

UNITED STATES PATENT OFFICE 2,295,395

SPEED CONTROL OF DIRECT CURRENT MOTORS

William H. Formhals, Pittsburgh, Pa., assignor to Westinghouse Electric & Manufacturing Company, East Pittsburgh, Pa., a corporation of Pennsylvania Application October 26, 1940, Serial No. 362,918

9 Claims. (Cl. 172—239)

My invention relates to a control system for maintaining a preselected constant speed of an electric motor.

An object of my invention is to provide a speed control system for an electric motor which will have a minimum amount of hunting.

Another object of my invention is to provide a speed control system for an electric motor which has an exceptionally small regulating generator, the sole purpose of which is to circulate a corrective current when the motor speed departs from a predetermined characteristic, the main energizing current being furnished by a constant potential source therefor, making it possible to use an exceptionally small regulating generator.

Another object of my invention is to provide a motor speed control system which will have a straight line speed-load characteristic for a wide range of speeds, irrespective of loading.

Another object of my invention is to provide a motor control system which is simple, inexpensive, but highly reliable in operation.

Other objects and advantages will become more apparent from a study of the following specification when considered in conjunction with the accompanying drawing, in which the single figure is a schematic showing of a motor speed control system embodying the principles of my invention.

My invention may be broadly stated as comprising the use of a small regulating generator having several field windings which, in normal operation (such as no-load), balance each other and, thus, cause no output from the regulator. Any slight change in power input to one of the field windings due to a speed change, as caused by loading, is amplified and the regulating generator supplies a much larger amount of power to a field winding on the generator, thus furnishing power to the system and causing its voltage to change in such a direction as to maintain constant speed of the motor.

Referring more particularly to the single figure, G is a generator and R is a regulator, the armatures of which are mechanically coupled to a prime mover, as indicated by dotted lines.

The armature of the generator G is connected in loop circuit or in series relationship with the armature of the motor M. The regulator is energized by a field winding 1 connected in series with a variable resistor 2 which is fed by a constant voltage source of direct-current potential such as indicated by the symbols + and —. The generator is energized by a separately excited, main field winding 3 connected in series with a variable resistor 4 which is in series circuit relationship with the direct-current energizing source. The generator has an auxiliary field winding 5 connected in series with the self-excited regulator field winding 6 and with the armature of the regulator. An additional field winding 7 of the regulator is wound in magnetic opposition to field winding 1, and is made to have the same magnetomotive force by suitable adjustment of variable resistor 10 so that current flowing in the generator armature circuit of pilot generator P for the desired motor speed (and thus pilot generator speed) causes the same number of ampere turns of field winding 7 as in the field winding 1. Magnetomotive forces of windings 7 and 1 indicated by the arrows are equal and opposite for no-load operation of the motor. The motor M is energized by separately excited field winding 8 connected in series with a variable resistor 9 across the direct-current constant source of potential. The pilot generator G has its armature mechanically coupled to the motor armature, as indicated by dotted lines so that it will always develop a voltage proportional to the speed of the electric motor. The pilot generator armature is connected in series with a variable resistor 10 and with the regulator field winding 7. The pilot generator is energized by separately excited field winding 11 which is connected in series with the variable resistor 12 across the direct-current constant potential energizing source indicated by the symbols + and —. The three variable resistors 4, 9, and 10 are manually operated by any suitable manual operating means 13. Insulating means 14 are provided to separate the electrical circuit of variable resistor 10 from that of 4 and 9. A conductor 15, which is connected to the (—) terminal source is connected to a shaft 16 which forms a common terminal means for resistors 4 and 9. Resistors 4 and 9 determine the desired motor speed by variation of armature voltage and field weakening. The system of variable resistors 4—9—10 is calibrated as indicated by numeral 17 so that for a given setting of desired speed, the correct value of resistance is inserted in the circuit including the regulator field winding 7 and the pilot generator armature.

If the variable resistors are set for any given speed, as indicated by calibrations at 17, and the motor is actually running at that speed, field windings 7 and 1 completely neutralize each other and the regulator will circulate no current through the generator field winding 5. If, however, the motor speed is lower than it should be, then the voltage of the pilot generator will be lower, causing a lower current to flow through the field winding 7. Since the ampere turns in field winding 1 remain constant, this decrease in field strength of field winding 7 will leave a resultant magnetomotive force, which will cause the regulator to build up and send current through field winding 5, causing the voltage applied through the motor to rise. This will result in an increase in speed of the motor until the voltage of the pilot generator is sufficient to create the necessary ampere turns in field winding 7 to balance the field windings 1 and 6. In this position, the motor is at its correct speed and the system is in balance.

If the motor speed were too high, the pilot generator voltage would be resulting in an increase in ampere turns of winding 7 which would leave a net ampere turn difference between windings 7 and 1 of opposite sign to that previously described. This would cause the regulating generator to build up in the opposite direction and circulate the auxiliary generator field winding 5 which would decrease the voltage applied to the motor and cause it to slow down until balance is again reached. These circulatory currents, which are generally non-existent during no-load operation of the motor and which are existent when the motor speed departs from its no-load value, are indicated by dotted arrows which show that they may be circulated in either of two directions to either add or subtract from the magnetomotive force furnished by the generator main field winding 3 so as to correct the motor speed to its preset value, as indicated by the calibration 17 on variable resistor 10. It will be understood however that the initial regulator adjustment can be made for other slopes than that of the air gap line (corresponding to the straight portion of the no-load, saturation curve of the main generator). Under such conditions, therefore, there may be circulatory currents at no-load, and no circulatory currents at one preselected speed (which occurs at the point of intersection of the saturation curve and the straight line representing the regulator character).

Anti-hunting is inherent in my control system since the corrective regulator current is always proportional to the amount of deviation from the correct speed value. Furthermore, creepage of the motor due to hysteresis is substantially eliminated.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made but wish to be limited only by the scope of the appended claims and such prior art that may be pertinent.

I claim as my invention:

1. An electric control system for maintaining a constant preselected speed of a motor, comprising, in combination, an electric motor having a main winding, a generator for energizing said motor having main and auxiliary speed control windings, a constant potential source for energizing said generator main winding, a regulating generator for energizing the auxiliary winding and having a pair of windings which are wound in magnetic opposition and which are adjusted to have the same ampere turns at "no load" of the motor, voltage generating means driven by said motor, said regulating generator being responsive to a differential effect between said constant potential source and said voltage generating means for circulating a corrective current through said auxiliary speed control winding to maintain the motor at the preselected speed.

2. An electric control system for maintaining a constant preselected speed of a motor, comprising, in combination, an electric motor having a main winding, a generator for energizing said motor having main and auxiliary speed control windings, a constant potential source for energizing said generator main winding, a regulating generator for energizing the auxiliary winding, and having a pair of windings which are wound in magnetic opposition and which are adjusted to have the same ampere turns at "no load" of the motor, a variable resistor, voltage generating means driven by said motor and connected in series with said variable resistor and one of said regulating generator windings, the other of said regulating generator windings being connected to said constant potential source, said regulating generator being effective to circulate a corrective current through said auxiliary speed control winding, proportional to the differential effect of the magnetomotive force of said pair of windings, only when the motor speed departs from its no-load characteristic, such as effected by loading.

3. An electric control system for maintaining a constant preselected speed of a motor, comprising, in combination, an electric motor having a main winding, a generator for energizing said motor having main and auxiliary speed control windings therefor, a constant potential source for energizing said generator main winding, a regulating generator for energizing the auxiliary winding, and having a pair of windings which are wound in magnetic opposition and which are adjusted to have the same ampere turns at "no load" of the motor, a variable resistor, voltage generating means driven by said motor and connected in series with said variable resistor and one of said regulating generator windings, the other of said regulating generator windings being connected to said constant potential source, said regulating generator having a third winding energized by the differential of the magnetomotive forces of said pair of windings and being effective to circulate a corrective current through said auxiliary speed control winding, only when the motor speed departs from its no-load characteristic, such as effected by loading.

4. A speed control system for maintaining constant motor speed irrespective of load, comprising, in combination, an electric motor, a source of energizing potential therefor, a generator having an armature connected in loop circuit with the armature of said motor, main and auxiliary control field windings on said generator for controlling the speed of the motor, voltage generating means directly responsive to said motor speed, a regulating generator driven at substantially constant speed and having three field windings, the first of which is connected to a source of constant potential, the second connected to said voltage generating means and having the same number of ampere turns but in magnetic opposition to the first winding and the third connected in series with the armature of said regulating generator and one of said generator auxiliary speed control windings and being effective to furnish a differential magnetomotive force to circulate a corrective current through said auxiliary speed control winding only when the motor departs from its no-load characteristic, such as the result of heavy loading on the motor.

5. A speed control system for maintaining constant motor speed irrespective of load, comprising, in combination, an electric motor, a source of energizing potential therefor, a generator having an armature connected in loop circuit with the armature of said motor, a pair of control field windings on said generator for controlling the speed of the motor, voltage generating means directly responsive to said motor speed, comprising a pilot generator having an armature mechanically coupled to the motor armature, a regulating generator driven at substantially constant speed and having three field windings, the first of which is connected to a source of constant potential, the second connected to said voltage generating means and having the same number of ampere turns but in magnetic opposition to the first winding and the third connected in series with the armature of said regulating generator and one of said motor speed control windings and being effective to furnish a differential magnetomotive force to restore balance among the three windings if they should become unbalanced, such as the result of heavy loading on the motor and to circulate a corrective current to correct the speed of said motor, said pilot generator having a field winding which is also energized by said constant potential source.

6. A speed control system for maintaining constant motor speed irrespective of load comprising, in combination, a variable voltage system including a generator and motor having their armatures connected in series relationship, a pair of field windings for the generator and a field winding for the motor, a constant voltage source for energizing one of said generator field windings and said motor field winding, a regulating generator having three field windings, the first energized by said constant potential source, voltage generating means directly responsive to said motor speed and connected in series with the second of said regulating generator windings, the ampere turns of the first and second regulating generator windings being equal and opposite or in balance at "no load," the third regulating generator winding being connected in series with the other of the generator field windings and with the armature of said regulating generator so that normally when the first and second regulating generator windings are balanced, such as at "no load" no current is circulated by the regulating generator but when the windings are unbalanced, such as the result of motor speed changes due to change in loading, a compensating current is circulated resulting in correction of the motor speed.

7. A speed control system for maintaining constant motor speed irrespective of load comprising, in combination, a variable voltage system including a generator and motor having their armatures connected in series relationship, a pair of field windings for the generator and a field winding for the motor, a constant voltage source for energizing one of said generator field windings and said motor field winding, a regulating generator having three field windings, the first energized by said constant potential source, voltage generating means directly responsive to said motor speed and connected in series with the second of said regulating generator windings, the ampere turns of the first and second regulating generator windings being equal and opposite or in balance at "no load," the third regulating generator winding being connected in series with the other of the generator field windings and with the armature of said regulating generator so that normally when the first and second regulating generator windings are balanced, such as at "no load" no current is circulated by the regulating generator but when the windings are unbalanced, such as the result of motor speed changes due to change in loading, a compensating current is circulated thereby resulting in correction of the motor speed and balance among the three windings of the regulating generator, three variable resistors connected in series with the motor field winding and the generator field winding energized by said constant potential source and with said second regulator field winding, said three variable resistors being simultaneously adjustable for varying the desired motor speed.

8. A speed control system for maintaining constant motor speed irrespective of load comprising, in combination, a variable voltage system including a generator and motor having their armatures connected in series relationship, a pair of field windings for the generator and a field winding for the motor, a constant voltage source for energizing one of said generator field windings and said motor field winding, a regulating generator having three field windings, the first energized by said constant potential source, a pilot generator having a field winding energized by said constant potential source and having an armature directly coupled to said motor armature thereby generating a voltage directly responsive to said motor speed and connected in series with the second of said regulating generator windings, the ampere turns of the first and second regulating generator windings being equal and opposite or in balance at "no load," the third regulating generator winding being connected in series with the other of the generator field windings and with the armature of said regulating generator so that normally when the first and second regulating generator windings are balanced, such as at "no load" no current is circulated by the regulating generator but when the windings are unbalanced, such as the result of motor speed changes due to change in loading, a compensating current is circulated through its third winding resulting in correction of the motor speed and restoration of balance among the three regulating generator windings.

9. A speed control sstem for maintaining constant motor speed irrespective of load comprising, in combination, a variable voltage system including a generator and motor having their armatures connected in series relationship, a pair of field windings for the generator and a field winding for the motor, a constant voltage source for energizing one of said generator field windings and said motor field winding, a regulating generator having three field windings, the first energized by said constant potential source, a pilot generator having a field winding energized by said constant potential source and having an armature directly coupled to said motor armature thereby generating a voltage directly responsive to said motor speed and connected in series with the second of said regulating generator windings, the ampere turns of the first and second regulating generator windings being equal and opposite or in balance at "no load," the third regulating generator winding being connected in series with the other of the generator field windings and with the armature of said regulating generator so that normally when the first and second regulating generator windings are balanced, such as at "no load" no current is circulated by the regulating generator but when the windings are unbalanced, such as the result of motor speed changes due to change in loading, a compensating current is circulated through its third winding resulting in correction of the motor speed and restoration of balance among the three regulating generator windings, three variable resistors connected in series with the motor field winding and the generator field winding energized by said constant potential source and with said second regulator field winding said three variable resistors being simultaneously adjustable for varying the desired motor speed.

WILLIAM H. FORMHALS.